Dec. 13, 1955 W. M. AYLE 2,726,728
AUTOMATICALLY RELEASED THROTTLE-SETTING HOLDER
Filed May 14, 1954
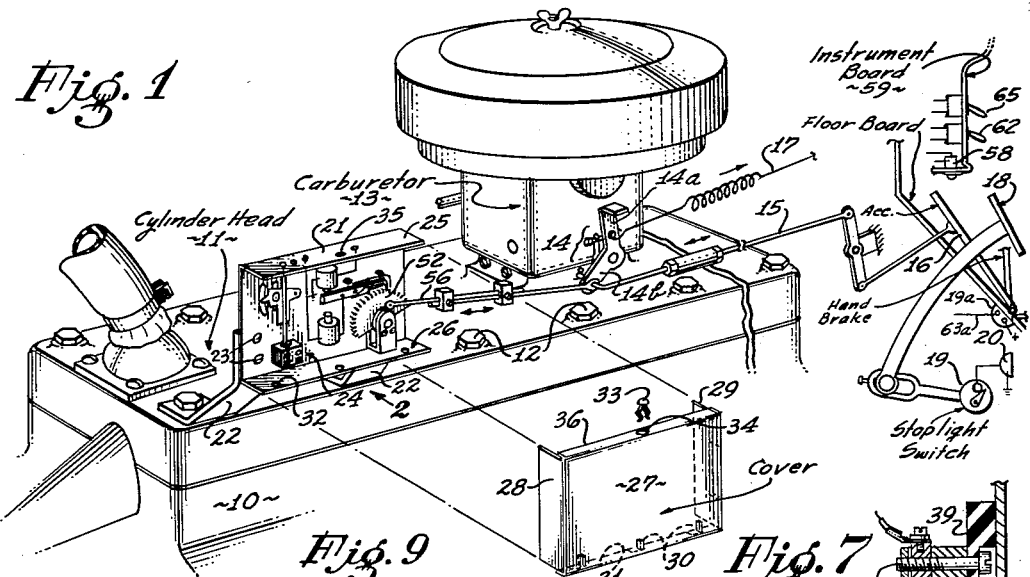
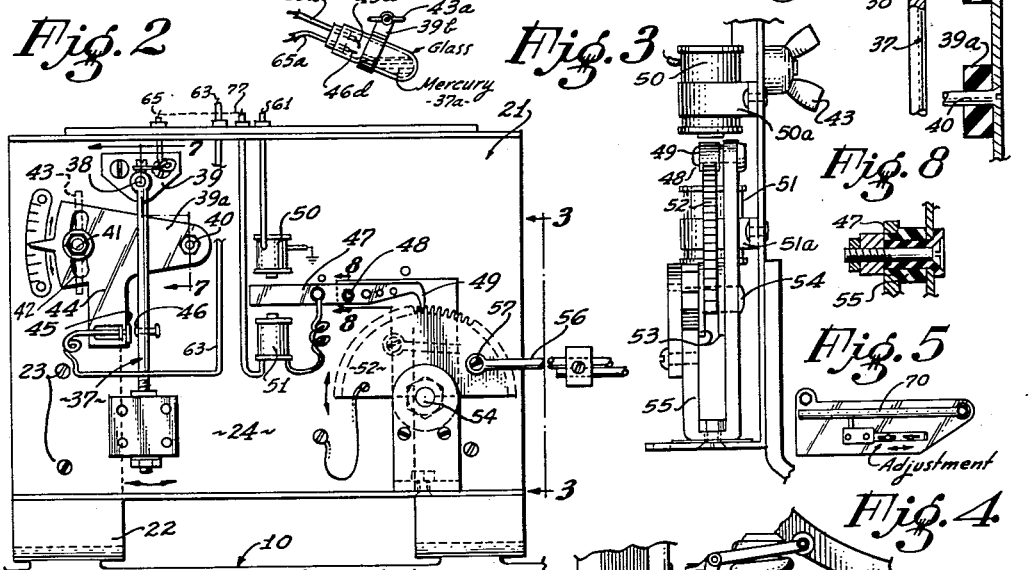
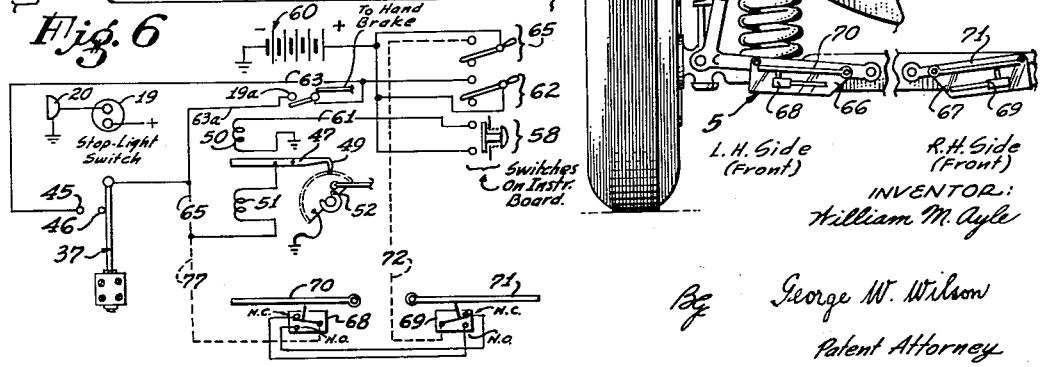
INVENTOR:
William M. Ayle
By George W. Wilson
Patent Attorney

United States Patent Office 2,726,728
Patented Dec. 13, 1955

2,726,728
AUTOMATICALLY RELEASED THROTTLE-SETTING HOLDER

William M. Ayle, Gardena, Calif.

Application May 14, 1954, Serial No. 429,957

8 Claims. (Cl. 180—82.1)

My invention relates to automotive vehicle throttle-control devices of the kind which may be set by the driver to maintain a desired speed of the vehicle until the device is released, and it is a primary object of my invention to provide an automatically released device of the kind described which under nearly all circumstances is operated independently of the brake mechanism of the vehicle.

In many areas distances are very considerable between towns or villages in passing through which speeds must be closely controlled, while in the open country the operator of the vehicle may safely cease operation of the usual engine accelerator pedal and instead bring a device into operation which will hold a desired setting of the engine throttle, thus reducing the fatigue of the driver caused by continuous operation of the engine throttle through the accelerator pedal.

It is, of course, necessary to provide means to release the throttle-setting holding device instantaneously should some emergency require the speed of the vehicle to be suddenly reduced, such emergencies usually requiring the use of both hands of the operator to work the steering wheel and both feet to work the engine clutch and brake.

It often happens that long, relatively level stretches of road are interrupted by more or less steep down hill grades on which the driver may want to use the braking effect of the engine when idling and may wish to free the throttle from the holding device for a time without going through a routine of manually releasing the device.

Another contingency which must be provided for is that the throttle-setting holding device should be arranged so that when the vehicle is being held stationary by the use of the brake the device is rendered inoperative.

A phenomenon of common occurrence in such long distance and monotonous driving is that the driver in an effort to shorten the time of passing through such country, will drive so continuously that he becomes drowsy and may become so slow in his reflexes that he may run off the road on a curve and may be wrecked if the car continues its speed after leaving the road, even if the sudden jolting jars the driver into wakefulness, while no damage might result if the speed of the car was reduced immediately to that corresponding to the idling speed of the engine.

The device of my invention is intended to meet all the requirements of the conditions above outlined.

Devices for holding the throttle of an automotive vehicle at a desired setting have been suggested, for instance by setting a throttle-holding device when a desired speed has been reached and releasing the device by operation of either the hand or foot brakes by means of a mechanical connection or by electrical switches operated by the brakes.

Such proposed arrangements, however, usually require the proper functioning of parts operated by the brakes to release the device and also require a variety of special fittings, or the making of various modifications of standard automobile fittings. In addition it is necessary, in many installations, to do considerable work to provide additional openings in the floor of the driver's compartment or in the substitution of special parts for standard components.

An object of my invention is to provide a throttle control device which may be put into operation by switch means controlling an electrical circuit at any desired speed to hold the carburetor throttle valve in the position required to maintain the speed, the device being taken out of operation, however, by the inertia of a pivoted member brought into operation by sudden reduction in the speed of the automotive vehicle, or by the wheels on one side of the vehicle running off the paved road onto a soft shoulder, or by irregular bumping of the vehicle due to striking a badly surfaced stretch of road.

It is another object of my invention to provide a throttle-control device which may be taken out of operation by the inertia of a pivoted member when descending a hill on which it is desired to use the compression of the engine to brake the vehicle.

It is a further object of my invention to provide a throttle-holding device contained in a small casing which may be readily mounted in place by the use of holding down studs or bolts provided in various patterns on the upper surfaces of the cylinder blocks of automotive engines, and to provide adjustable means enabling the device to be connected to the throttle control of different makes and models of automotive vehicles.

Still further objects and features of my invention will become apparent from the following specifications read with reference to the accompanying drawings and from the explanation of the operation of the device.

In the drawings, which illustrate embodiments of the invention at present deemed preferable by me:

Figure 1 is a general view partly in perspective and partly diagrammatic showing the throttle-setting holding device of my invention mounted in position on an engine block, throttle control and brake elements connected to the device also being shown.

Figure 2 is a front view of a casing shown in Figure 1 in which are arranged the throttle-setting holding element and a pendulum member acting to free the holding element when the vehicle speed is abruptly reduced, the parts being shown on an enlarged scale.

Figure 3 is a fragmentary cross section on the line 3—3 of Figure 2 drawn on an enlarged scale.

Figure 4 is a fragmentary detail view in front elevation showing the location and attachment of units of my device to the knee action elements of a front wheel of an automobile.

Figure 5 is a fragmentary detail view looking in the direction of the arrow 5 in Figure 4, drawn on a larger scale.

Figure 6 is a wiring diagram showing the component parts of the device connected in circuit.

Figure 7 is a fragmentary detail on the line 7—7 of Figure 2 shown in section and on a larger scale.

Figure 8 is a cross section on the line 8—8 of Figure 2.

Figure 9 is a fragmentary detail view of a modification in which a mercury switch is substituted for the pendulum shown in Figure 2.

A standard arrangement of automobile power plant will be first briefly described.

In Figure 1 the numeral 10 indicates the cylinder block of an automobile the head 11 of which is held down to the block by bolts 12 in the usual manner. A carburetor 13 is shown mounted on the head 11, the throttle or butterfly valve of which is operated by a bell crank lever 14. A throttle actuating rod 15 is connected between the lever 14 and the accelerator pedal 16 in the driver's compartment. The arm 14a of lever 14 is acted on by a take-off spring 17 in tension. The foot brake pedal 18 is shown connected to a tail light switch 19 controlling tail light 20.

It will be noted that none of the described components, which are typical of an automobile power plant, have been modified in any way, the device of my invention being very simply and easily connected to certain of the described components.

The major operative elements of the device of my invention are mounted in a small casing 21 supported by suitable bent brackets 22 secured to the head 11 by utilizing a pair of the holding down bolts 12. The casing 21 may be secured to the brackets by machine screws 23 and nuts thereon. The casing can be of any suitable arrangement, that illustrated comprising a back 24 and horizontal sides 25, 26 formed from one piece of sheet metal, while the front 27 and vertical sides 28, 29 are formed from a second sheet of metal detachably secured to the back member in any suitable manner, for instance by struck up tongues 30 extending from a horizontal lower flange 31 of the front 27 engageable in holes 32 of the lower horizontal side of the back 24, and a split pin 33 engaged in aligned holes 34, 35 in the horizontal upper flange 36 of the front 27 and horizontal upper side 25 of the back 24 respectively.

The parts of the device mounted in casing 21 comprise a small weighted pendulum 37 (Figure 2) preferably pivoted at 38 on a plate 39 of insulating material screwed to back 24. A second plate 39a is pivoted at 40 on the back 24 of the casing. The free edge of the plate may be adjusted vertically by any suitable arrangement, that illustrated comprising a bolt 41 passing through an arcuate slot 42 in the plate and a hole in the back 24.

A wing nut 43 is provided to grip the plate firmly between the head of the bolt and back 24. A downward extension 44 of plate 39 carries a contact 45 adapted to engage against a contact 46 on the stem of the pendulum when the latter swings forwardly as will be later explained.

This adjustment is provided to ensure that as the pendulum hangs perpendicularly the relative position of contacts 45 and 46 can be adjusted to remain constant when the casing is installed on any engine block, which in some makes of automobile are slanted downwardly and rearwardly.

A magnetic metal lever 47 is pivoted at 48 on back 24 and is turned downwardly at one end, the down turned end being shaped to fit accurately between the teeth of a gear segment to form a detent 49. The arm of the lever opposite to the detent end is heavier than said detent end for a purpose which will later be explained.

The lever 47 is rotated to lower the detent 49 by means of an electromagnet 50, when energized. While the weight of the heavier arm may be relied on to normally hold the detent in raised position when electromagnet 50 is not energized, I may prefer to provide a second electromagnet 51 which, when it is energized and electromagnet 50 is deenergized, will positively raise detent 49 by pulling down the end of lever 47 opposite thereto. Electromagnets 50 and 51 may be mounted by clips 50a and 51a on the back 24 of the casing.

The detent 49 is formed to fit accurately between the teeth of a gear segment 52. This segment may be formed by cutting a gear wheel in two along its diameter and securing washers 53 as by spot welding to each face to provide a bearing for a pivot 54 on which the gear segment assembly freely turns. Shaft 54 is supported in a U-shaped bearing member 55 secured to the back 24 of the casing 21 but insulated therefrom. The bearing member 55 may be formed by bending up the longer arm of an L-shaped strip of metal as shown in Figure 3, the shorter arm extending at right angles to the longer arm providing a bearing for pivot 48 of lever 47.

The gear segment 52 is connected by an adjustable rod 56 pivoted at 57 to the half gear segment 52 and to the bell crank arm 14b of butterfly valve lever 14. It will be noted that when pressure on the accelerator pedal 16 is released, the pull of the take-off spring 17 exerts a push on rod 56 which aids in frictionally holding detent 49 in engagement with the teeth of the half gear segment. This characteristic is made use of when starting down a grade on which it is desired to utilize the engine compression, when running at idling speed, as an aid to braking.

The system so far described, the characteristic feature of which is the utilization of the inertia of a suspended weight to automatically disconnect a throttle-setting holding device, is complee in itself when connected in an electric circuit as shown in full lines in the circuit diagram of Figure 6.

A push button initiating switch 58 is preferably mounted below the lower edge of the dash board or instrument panel 59 (Figure 1). This switch operates when closed momentarily to conduct current from battery 60 through lead 61 and electromagnet 50, thus energizing the electromagnet and engaging detent 49 with gear segment 52, the engagement of the detent being maintained after release of the push button switch by the friction of the gear teeth against the detent. To manually release the setting of the device, it is only necessary to apply pressure to the accelerator pedal, the movement being, however, very slight and without noticeable effect on the throttle valve.

The procedure above described to release the detent 49 device is followed when it is desired to use the engine at its idling speed as an auxiliary brake, and also of course is effective if it is desired to release the detent 49 preparatory to accelerating the engine. It will be noted that use of the brakes of the automobile is not involved in the operations so far described.

A switch 62, also mounted on the dash, connects control of the device through a switch 19a and branch circuit 63a with the operation of the emergency brake in addition to energizing the main circuit 63 of the throttle-setting maintainer. Closing switch 62 establishes a circuit from battery 60 through lead 63 to contact 45. A circuit is also established through 19a closed when the hand brake it used to lead 65, independent of the stop light foot brake circuit, the switch 19 of which is operated in the usual way by operation of the brakes. When the speed of the vehicle is suddenly checked the pendulum 37 will swing forward, closing contacts 46 and 45 and completing a circuit through electromagnet 51 and lever 47 to ground through gear segment 52, until the energized electromagnet 51 has pulled down the adjacent arm of lever 47, thus breaking the circuit through gear segment 52 when detent 49 leaves the latter.

It will be seen that the electric circuit through electromagnet 50 is completed only while button 58 is held depressed and through electromagnet 51 only when the forward swing of pendulum 37 closes contacts 45, 46, and that as soon as the detent 49 and gear segment are disengaged the circuit through electromagnet 51 is broken. The arrangement described has the advantage that electric current is drawn from the battery only for the instant while engaging and disengaging the detent by electrical means, no current flowing continuously through the circuit, even when the brake is held on as when the car is being held at a stop signal on an uphill grade.

In Figure 9 the pendulum member of Figure 2 is substituted by a mercury switch which is equivalent in all respects to the pendulum, for which reason the parts have been given the same numerals as in Figure 2 with the addition of suffixes and no detailed description is therefore thought necessary. Any sudden reduction in speed of the vehicle will cause the mercury 37a to flow forward in the glass tube and close contacts 45d and 46d.

I prefer to apply the novel concept of utilizing the inertia of a movable weight to incorporate devices mounted on the front axles of the modern automobile in which each front wheel is mounted on its own axle which is sprung independently of the axle of the other front wheel. The suspension of the front wheels is very flexible and the movement of the axles is utilized for useful purposes now to be described. It is to be understood the fitting of the device may also be made at each side of the straight form of front axle.

In driving over concrete roads the expansion joints provided about every ten yards or so and extending across the highway are filled with tar, bitumen or the like which often works out to a considerable height above the surface of the pavement, imparting a recurrent simultaneous sharp upward movement of both front wheels to a limited extent. Such movement does not cause the throttle-holding device of my invention to be de-activated.

Often stretches of badly surfaced roadway will be encountered, making careful driving necessary to avoid damage to the tires, such stretches may be encountered unexpectedly and before the driver has realized that speed should be at once reduced from a steady speed of 40 M. P. H., for instance. The first bad bump of either front wheel will cause the throttle-holding device to be de-activated.

To provide for the conditions above outlined, a switch 65 is provided on the dash of the automobile and plates 66, 67 are rigidly fixed one on each side of the front axle. A micro switch 68 with a normally open terminal, a normally closed terminal, and a common terminal is mounted at the inner end of one plate, and a similar micro switch 69 is mounted at the inner end of the opposite plate. Bars 70, 71 are pivoted at one end to the plates 66, 67, the free ends of the bars extending over the plungers of the micro switches.

In order to provide automatic retarding of engine to idling speed, by either front wheel suddenly dropping to a lower level, as for instance by the automobile running off the hard pavement onto a soft shoulder, the switches on the front wheel suspension are wired with the normally open terminal of switch 68 connected to the normally closed terminal of switch 69, and the normally open terminal of switch 69 connected to the normally closed terminal of switch 68, while the common terminal of switch 68 is connected to electromagnet 51 and the common terminal of switch 69 is connected through switch 65 to battery 60. This crossing of wires between switches maintains an open circuit, if both wheels strike a bump simultaneously, but causes a closed circuit between the battery and the releasing electromagnet 51, when a slight bump is encountered by either front wheel alone to release the detent 49 from the gear segment 52. It is assumed that the driver's foot is not resting on the accelerator pedal since the throttle-setting holder was in use, so that the engine will at once revert to idling speed.

A brief summary of the operation of the device follows; it is assumed that the driver of the automobile is driving an open road and wishes to maintain the speed at which he is driving, for instance 40 M. P. H., but to take his foot from the accelerator pedal to rest.

Switches 62 and 65 are operated and push button 58 depressed, the detent means will immediately engage the toothed quadrant and hold the setting of the throttle valve, and the switches operated by undue vibratory movement of one wheel with respect to the opposite wheel will be in the power circuit.

If the driver wishes to accelerate temporarily, for instance to pass a vehicle, a slight push on the accelerator pedal will release the throttle-holding device and enable the accelerator to be used in the normal way until the driver wishes to resume use of the holding device which can be done by again depressing the push button switch. If the driver reaches a downhill grade and wishes to use the engine at reduced speed as a brake, he can release and reset the device as described.

Should the driver need to hold the vehicle stationary by the use of the brakes, the stop light switch connected to the hand brake will be closed and the auxiliarly circuit through said switch will at once release the holding device although the pendulum controlled contact may not be closed as for instance while the vehicle is stopped on an upgrade.

At all times, however, any sudden checking of the speed of the vehicle will result in the pendulum swinging forward, closing contacts 45 and 46, thus automatically moving the detent 49 out of engagement with the toothed segment 52 and thus enabling the usual take-off spring 17 to close the throttle to idling speed.

Should the vehicle strike a bad surfaced stretch of road, or run off a concrete road surface, which is generally higher than the road shoulder, one or other of switches 68, 69 will be operated, thus rendering the throttle-holding means inoperative.

It will be apparent that I have provided a novel and useful device to aid in rendering distance driving less fatiguing and have fully described and shown a preferred embodiment of my invention, but it is to be understood that modifications of the described embodiment may be made by those skilled in the art without departing from the scope of the invention as defined by the appended claims.

What is claimed is:

1. In an automotive vehicle having an engine controlled by a throttle valve and a throttle control rod extending from said throttle valve to a driver actuated element within the driver's compartment, a throttle valve setting retainer means, comprising: a movable member mounted on said vehicle; a connecting member between said movable member and the throttle valve; resilient means tending to move the throttle and movable member toward idling position said resilient means being stressed in opening the throttle; a detent member adapted to engage with and prevent movement of the movable member but arranged to be normally held out of engagement with said member; electromagnetic means arranged when energized to cause engagement of said detent member with the movable member; an electric circuit including said electromagnetic means and a normally open switch in the driver's compartment momentarily closed to energize said circuit and thereby the electromagnetic means, the engagement of the detent with the movable member being thereafter maintained by friction between said detent and movable member caused by said resilient means, the detent being released from the movable member whenever desired by moving said connecting member by operation of the throttle rod in a direction to overcome the effort of said spring sufficiently to reduce the friction between the detent and movable member to enable the detent to free said movable member.

2. In an automotive vehicle having an engine controlled by a throttle valve and a throttle control rod extending from said throttle valve to a driver actuated element within the driver's compartment, a throttle valve setting retainer means, comprising: a movable member mounted on said vehicle; a connecting member between said movable member and the throttle valve; resilient means tending to move the throttle and movable member toward idling position said resilient means being stressed in opening the throttle; a detent member adapted to engage with and prevent movement of the movable member but arranged to be normally held out of engagement with said member; electromagnetic means arranged when energized to cause engagement of said detent member with the movable member; an electric circuit including said electromagnetic means and a normally open switch in the driver's compartment momentarily closed to energize said circuit and thereby the electromagnetic means, the engagement of the detent with the movable member being thereafter maintained by friction between said detent and movable member caused by said resilient means; further electromagnetic means in said circuit acting when energized to release the detent from the movable member; further normally open switch means in said circuit operative when closed to complete a circuit to ground through said further electromagnetic means; and means independent of the attitude of the vehicle and speed of the engine and actuated solely by their momentum on sudden reduction in speed of said vehicle to close said further switch means.

3. An automatically released throttle valve-setting maintainer for automotive vehicles comprising: a toothed member; means connecting said toothed member to throttle control means and to driver operated means for controlling said throttle so that movement of the driver operated means will move said toothed member, when free to move; a resilient means tending to move said means for controlling said throttle and the toothed member in a direction toward minimum open position of the throttle; a detent member adapted when actuated to engage with said toothed member; an electromagnet adapted when energized to move said detent member into engagement with said toothed member; a driver operated switch; an electric circuit provided with a source of electrical energy and momentarily energized by the operation of said switch to energize said electromagnet to engage the detent with the toothed member, engagement of the parts being thereafter maintained, until the detent member is withdrawn; by friction exerted on the detent member by the toothed member by the effort exerted thereon by said resilient means; a second electromagnet adapted, when energized, to withdraw said detent from the toothed member; a pendulum, and further switch means operated by the forward swinging of said pendulum on sudden deceleration of the automobile to complete an energizing circuit for said second electromagnet to effect positive withdrawal of the detent from the toothed member.

4. An automatically released throttle valve-setting retainer as set forth in claim 3 and in addition comprising: switch means mounted adjacent the wheels of the vehicle; and pivoted weight members mounted adjacent said switches and effective to operate on materially greater vertical movement of one wheel than the opposite wheel of the vehicle one of said switches by the relative movement of the weight member and switch adjacent that wheel to direct electric current through said second electromagnet to free the detent from the toothed member and enable the throttle to return to engine-idling position.

5. An automatically released throttle valve-setting retainer as set forth in claim 4 in which each switch is double pole single throw, the switch on one side of the vehicle being normally open and the switch on the opposite side of the vehicle being normally closed, and wiring connecting said switches in the circuit so that the operation of either switch is effective to operate said second electromagnet but simultaneous operation of both switches is ineffective to operate said second electromagnet.

6. An automatically released throttle valve-setting maintainer as set forth in claim 3 and in addition comprising a make-and-break switch operated by the emergency brake of the vehicle and a circuit directly connected from the source of electrical energy to said second electromagnet to ensure that the detent is released from said toothed member whenever the emergency brake is applied.

7. An automatically released throttle valve-setting maintainer as set forth in claim 3 in which said detent member is formed as a pivoted lever having a detent at one end, the opposite end of the lever being heavier than the detent end; a horizontal pivot for said lever; and an electromagnet arranged when energized to draw said detent into engagement with the toothed member; the driver when required, releasing said detent from the toothed member without the operation of said second solenoid by relieving frictional force between the toothed member and said detent caused by said resilient means by a partial movement of said driver operated means in a direction to further open said throttle.

8. An automatically released throttle valve-setting maintainer as set forth in claim 3 and in which the electrical circuit through said second solenoid is grounded through said detent member and toothed member so that when the detent is disengaged from the toothed member the circuit through said second solenoid is opened.

References Cited in the file of this patent
UNITED STATES PATENTS

| | | |
|---|---|---|
| 1,299,644 | Whitbeck | Apr. 8, 1919 |
| 1,990,354 | Sylvester, Jr., et al. | Feb. 5, 1935 |
| 2,114,359 | Selje | Apr. 19, 1938 |
| 2,243,354 | Musser | May 27, 1941 |
| 2,450,113 | Burchett | Sept. 28, 1948 |